United States Patent
Levy et al.

(10) Patent No.: US 9,557,799 B2
(45) Date of Patent: Jan. 31, 2017

(54) SENSOR INTERFACE SYSTEMS AND METHODS

(71) Applicant: Infineon Technologies AG, Neubiberg (DE)

(72) Inventors: David Levy, Wernberg (AT); Harald Witschnig, Landskron (AT); Dirk Hammerschmidt, Villach (AT); Wolfgang Scherr, Villach/Neulandskron (AT); Andrea Morici, Villach (AT)

(73) Assignee: Infineon Technologies AG, Neubiberg (DE)

(*) Notice: Subject to any disclaimer, the term of this patent is extended or adjusted under 35 U.S.C. 154(b) by 709 days.

(21) Appl. No.: 13/933,581

(22) Filed: Jul. 2, 2013

(65) Prior Publication Data

US 2015/0012767 A1    Jan. 8, 2015

(51) Int. Cl.
G06F 13/32 (2006.01)
G06F 1/32 (2006.01)
G06F 1/26 (2006.01)

(52) U.S. Cl.
CPC .............. G06F 1/324 (2013.01); G06F 1/266 (2013.01); G06F 1/3253 (2013.01); Y02B 60/1235 (2013.01)

(58) Field of Classification Search
CPC ..... G06F 13/42; G06F 13/385; G06F 13/4282
See application file for complete search history.

(56) References Cited

U.S. PATENT DOCUMENTS

| | | | | |
|---|---|---|---|---|
| 6,243,004 B1* | 6/2001 | Flick | ...................... | B60R 16/03 180/287 |
| 6,959,356 B2* | 10/2005 | Packwood | .............. | H04L 69/18 700/1 |
| 7,304,401 B2* | 12/2007 | Enders | ................ | B60R 16/0315 307/10.1 |
| 7,349,347 B2* | 3/2008 | Yanagida | ............... | H04B 3/548 370/252 |
| 7,454,170 B2* | 11/2008 | Goossens | ............... | G08C 17/04 455/41.1 |
| 7,920,585 B2 | 4/2011 | Mizutani | | |
| 7,978,600 B2* | 7/2011 | Itabashi | .............. | H04L 12/4135 370/229 |
| 8,428,154 B2* | 4/2013 | Ishiko | .................... | H04B 3/544 375/257 |
| 8,478,212 B2* | 7/2013 | Moon | .................... | H01Q 1/248 375/295 |
| 8,990,464 B2* | 3/2015 | Kessler | ............... | G06F 13/4295 710/104 |
| 2011/0064126 A1 | 3/2011 | Ishiko | | |

(Continued)

FOREIGN PATENT DOCUMENTS

CN    101422005 A    4/2009

*Primary Examiner* — Brian Misiura
(74) *Attorney, Agent, or Firm* — Eschweiler & Associates, LLC

(57) ABSTRACT

A sensor interface system includes a system bus, a bus master and a sensor. The bus master is coupled to the system bus. The bus master is configured to provide voltage regulation at a first band and perform data transmission within or at a second band. The sensor is also coupled to the system bus. The sensor is configured to receive or utilize the voltage regulation and to perform data transmission within or at the second band.

19 Claims, 5 Drawing Sheets

(56) References Cited

U.S. PATENT DOCUMENTS

| | | | |
|---|---|---|---|
| 2015/0012678 A1* | 1/2015 | Levy | G06F 13/385 710/110 |
| 2015/0071369 A1* | 3/2015 | Levy | H04L 27/148 375/272 |
| 2015/0318694 A1* | 11/2015 | Stevens | H02J 1/00 307/52 |

* cited by examiner

SENSOR INTERFACE SYSTEMS AND METHODS

BACKGROUND

Automotive systems are complex systems that include computers and components to operate and monitor operation automotive vehicles. The systems typically include a processor that controls and monitors engine operation and the like. The system generally operates various control systems that perform automotive functions. By monitoring, minor problems can be identified and corrected before becoming major problems.

Automotive systems typically use a dual purpose bus to mitigate wiring and cost. The bus provides power to sensors and components and also is used for data transmission. Generally, attempts to improve providing of power degrade data transmission and, similarly, attempts to improve data transmission degrade providing of power.

DETAILED DESCRIPTION

Figure 1:
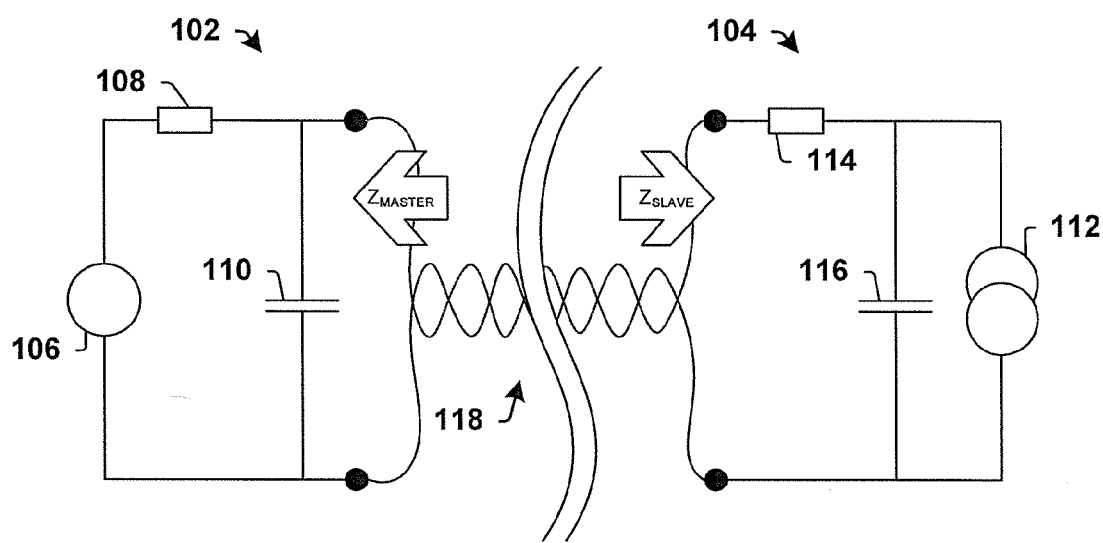
FIG. 1 is a diagram illustrating a conventional sensor interface requiring buffer capacitors.

The present invention will now be described with reference to the attached drawing figures, wherein like reference numerals are used to refer to like elements throughout, and wherein the illustrated structures and devices are not necessarily drawn to scale.

Systems and methods are disclosed that facilitate automotive systems and include a sensor interface. The interface excludes data transmission from the bandwidth of the voltage regulation in combination with input and output impedances of a bus master and sensors that is sufficiently matched to line impedance to mitigate resonance effects.

FIG. 1 is a diagram illustrating a conventional sensor interface 100 requiring buffer capacitors. The diagram represents operation of the interface 100. It is appreciated that the diagram is simplified for illustrative purposes and other components can be present.

The sensor interface 100 includes a bus master side 102 and a slave or sensor side 104. The bus master side 102 and the sensor side 104 are connected by a bus 118. The bus master side 102 is also referred to as the bus master 102. Similarly, the sensor side 104 is also referred to as the sensor 104. Here, the bus 118 is a two wire bus or interface. The bus 118 is utilized for power supply and data transmission. The bus 118 has a bus line impedance, such as 120 ohm and a line inductance. The line inductance is based on length, which can range from a few centimeters to several meters. It is appreciated that other sensors and/or components can be coupled to the bus 118 in addition to the bus master side 102 and the sensor side 104.

The bus master side 102 includes a voltage source 106, a bus master resistor 108, and a master buffer capacitor 110. The master buffer capacitor is connected to first and second terminals of the bus 118. The bus master resistor 108 is connected to the voltage source 106, the capacitor 110, and the first terminal of the bus 118. The master buffer capacitor 110 stabilizes the supply voltage and assists with electro-mechanical compliance (EMC). The capacitor 110 has a capacitance below about 50 nF. The bus master resistor 108 facilitates termination impedance and has a value of about 1-15 ohm. The bus master side 102 has an impedance $Z_{MASTER}$, which is relatively low compared to the line impedance. The bus master resistor 108 facilitates termination impedance at low frequencies, while the parallel capacitor dominates at higher frequencies.

The sensor side 104 includes a current source 112, a sensor resistor 114, and a sensor buffer capacitor 116. The sensor resistor 114 facilities termination impedance and is coupled to a third terminal of the bus 118. The sensor resistor 114 has an impedance of 1 to 50 ohms. The sensor buffer capacitor 116 is connected to the sensor resistor and a fourth terminal of the bus 118. The sensor buffer capacitor 116 stabilizes the supply voltage and assists with EMC. The current source 112 is connected in parallel to the sensor buffer capacitor 116. The sensor side 104 has an impedance $Z_{SLAVE}$. The sensor resistor 114 facilitates termination impedance and contributes to $Z_{SLAVE}$, which is relatively high at low frequencies and goes down at higher frequencies when the capacitor is getting effective.

Data transmission for the bus master side 102 is performed by voltage modulation while the sensor side 104 performs data transmission by modulation of the sensor side's 104 current consumption. Transmit signals are used to transmit the data. The transmit signals have relatively high signal amplitudes to protect against distortion.

The data rates and resulting transmission frequencies are relatively low. The combination of high amplitudes and long durations for the transmission of a bit requires that voltage regulators need to be able to follow the load current change caused the transmission signals of the sensor side 104 in order to avoid a relatively high drop of the supply voltage during the modulation. As a result, highly complex voltage regulators are needed that follow strong transients compared to usual voltage supplies that could supply sensors with a current consumption that changes just slowly in a narrow range.

The bus master side 102 needs to be low impedance or low ohmic in order to stabilize the supply voltage and, therefore, operates as a voltage source up to frequencies above a modulation signal spectrum. The sensor side 104 ideally behaves like a current source and exhibits a relatively high impedance. This setup with a low impedance bus master side 102 and a high impedance sensor side 104 implies problematic line termination setups, short or open, on either side. Additionally, the line termination is made worse by the presences of buffer capacitors utilized to stabilize the supply voltage and comply with electro-mechanical requirements. The presence of the buffer capacitors makes the impedance seen at the bus 118 frequency dependent. Further, high reflection factors resulting from insufficient termination result in resonance effects which appear at frequencies depending on a length of the bus 118.

Figure 2A:
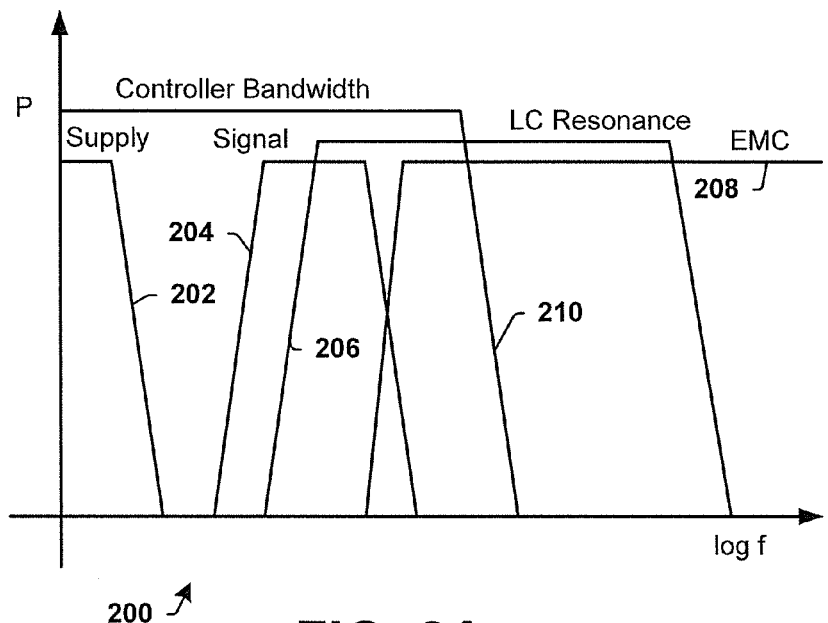
FIG. 2A is a graph depicting spectral locations for signals in a conventional sensor interface.

FIG. 2A is a graph depicting spectral locations for signals in a conventional sensor interface. The locations are provided as examples of typical signals generated by a conventional sensor interface, such as the interface 100, described above.

The graph depicts a logarithmic frequency along an x-axis and power spectral density range (P) along a y-axis. The graph includes supply signal 202, a sensor signal 204, an LC resonance signal 206, EMC 208, and a controller signal 210.

The supply signal 202 is the output of the voltage source of a bus master. The supply signal 202 has a small bandwidth, range of operating frequencies, and a low frequency, near zero. The sensor signal 204 is a signal generated by the sensor side 104. The sensor signal 204 has a small bandwidth and is located at a somewhat higher frequency. However, due to EMC resonance, the sensor signal 204 requires a relatively large amplitude. Thus, the sensor signal 204 utilizes substantial power The LC resonance signal 206 is shown with a relatively large bandwidth. The LC resonance signal 206 is a function of buffer/blocking capacitors 110 and 116, line capacitance, and line inductance. It is noted that the LC resonance signal 206 conflicts and can degrade at least a portion of the sensor signal 204.

The controller signal 210 is a signal that controls the voltage source 106. This signal has a relatively large bandwidth and can include or exclude the LC resonance frequencies depending on the actual bus setup. This makes the design of the voltage regulator extremely complicated, since it has to handle very different load setups which are not known in advance. The EMC signal 208 represents electromagnetic interference present in the sensor system. The EMC signal 208 typically varies upon implementation and operating environment. However, it is relatively large in amplitude and bandwidth. Further, the EMC signal 208 interferes with the controller signal 210 and the sensor signal 204.

Figure 2B:
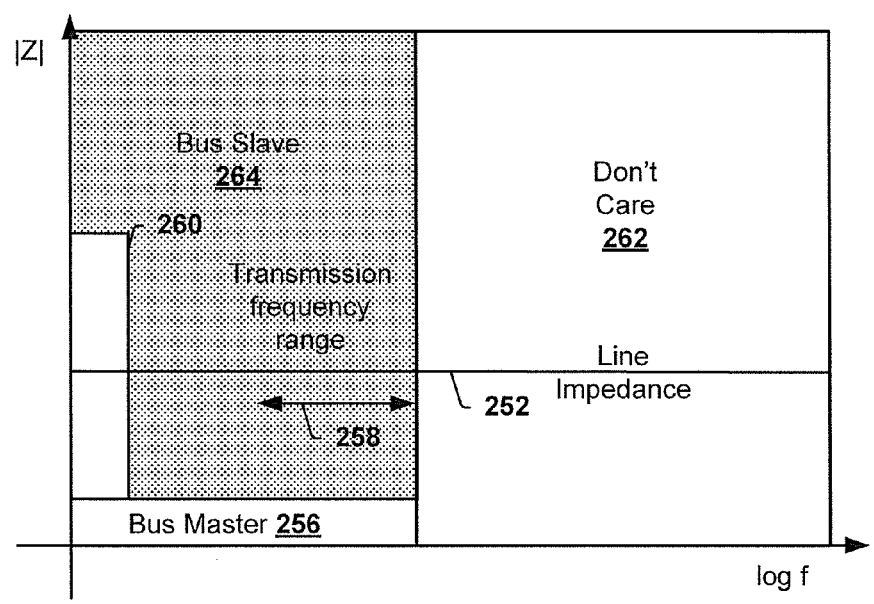
FIG. 2B is a graph depicting frequency dependencies for a conventional sensor interface.

FIG. 2B is a graph depicting frequency dependencies for a conventional sensor interface. The dependencies are provided as examples based on conventional sensor interfaces, such as the interface 100 described above.

An x-axis depicts frequency in a logarithmic fashion (log f). The y-axis depicts impedance Z in absolute value.

A range for the bus master impedance is represented by a rectangle shown at 256. The bus master impedance is for a conventional bus master and is relatively low up to frequencies that cover the signal spectrum that is required for the communication. A range for the slave or sensor impedance is given by the whole left side of the plane 264 excluding a rectangular portion 260. It typically stays above the bus master impedance up to the end of the transmission signal spectrum, since the sensor should behave like a modulated current sink. The sensor or slave impedance can be much larger than at 256, especially at lower frequencies but it can decrease with increasing frequencies due to the blocking capacitor. A relatively constant line impedance is shown by line 252. It can be seen that the line impedance is substantially constant with varied frequencies. In one example, the line impedance is 120 ohm.

Data transmission typically occurs at a range of frequencies indicated by 258. It is noted that a region 262 of frequencies and impedances are labeled as "don't care" since in that the region neither the master nor the slave impedance does substantially impact voltage regulation and/or data transmission of the bus.

Figure 3:
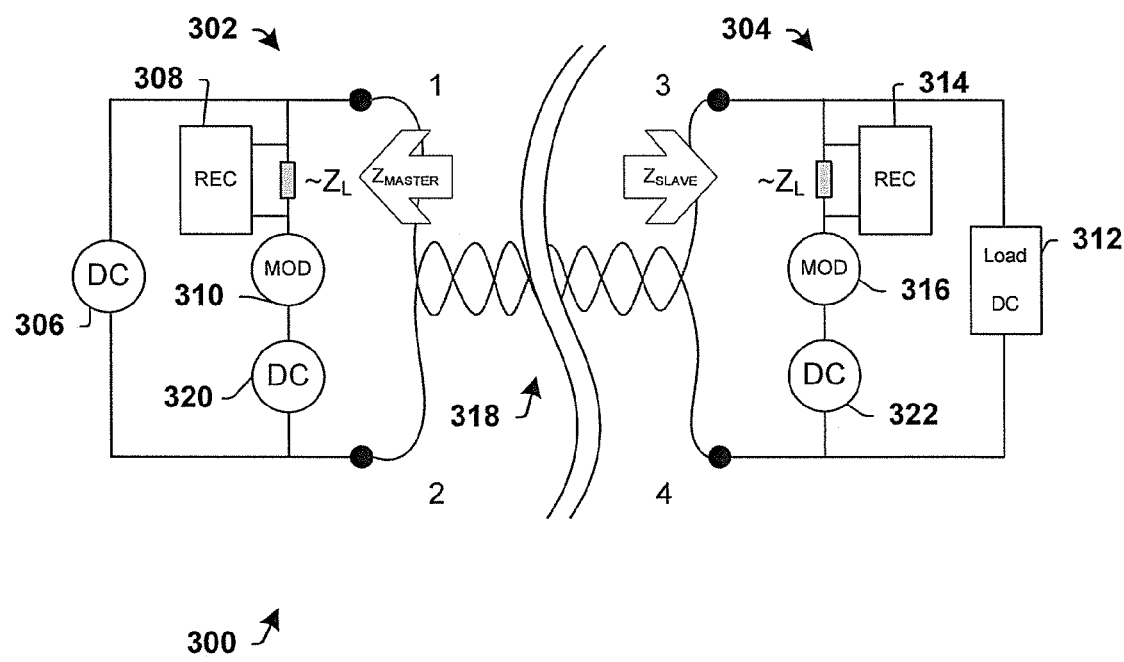
FIG. 3 is a diagram illustrating a sensor interface system that separates frequency bands for data transmission and voltage regulation.

FIG. 3 is a diagram illustrating a sensor interface system 300 that separates frequency bands for data transmission and voltage regulation. The system 300 incorporates modulation techniques to shift the data transmission signals to higher frequencies that exclude the band that is required for the voltage regulation. Further, the modulation amplitudes are relatively lower than conventional interfaces because of the frequency separation. Additionally, blocking or buffer capacitors are not needed or utilized. Similarly, external resisters and not required. The system 300 can be utilized as or with automotive systems and the like. Additionally, it is appreciated that additional components can be included or added to the system.

The system 300 includes a bus master side 302 and a slave or sensor side 304. The bus master side 302 and the sensor side 304 are connected by a bus 318. The bus 318 is shown a two wire bus or interface, however other bus configurations are permitted. The bus 318 is utilized for voltage regulation (power supply) and data transmission. The bus 318 is shown connecting the bus master side 302 and the slave/sensor side 304, however it is appreciated that other components, such as sensors, electronic control units, actuators, throttle mechanisms, air bag mechanisms, anti-lock brake systems, and the like can also be connected to the bus 318. Further, it is appreciated that a single sensor 304 is shown in the drawing and this discussion for illustrative purposes. However, additional sensors similar and/or identical to the sensor 304 can also be connected to the bus 308.

The bus 318 has several characteristics including line impedance and line inductance. The line impedance, in one example, is about 120 ohm. In another example, the line impedance is within a range of about 50 to 200 ohm. The line inductance varies on distance or wire length between the master side and the sensor side. In one example, the distance is only a couple centimeters, in another the distance is about 12 meters. The distance and, as a result, the line inductance can vary substantially. In one example, the distance can range from a centimeter to 20 meters. This variation contributes to unknown and/or difficult to predict resonance frequencies.

The bus master side 302 includes a voltage source 306, a bus master receiver 308, a bus master modulation component 310, and a modulation bias voltage source 320. The voltage source 306 is a DC supply and has a limited bandwidth compared with other approaches and therefore it does not shortcut the modulation signals which are generated outside of its voltage regulation band. It does not use frequency ranges used for transmission. The voltage source 306 is connected to first and second terminals of the bus 318. The bus master receiver 308, the modulation component 310 and the modulation voltage bias source 320 collectively form a bus master transceiver path.

The modulation bias voltage source 320 is connected to the second terminal and provides a modulation voltage generally less than the voltage provided by the voltage source 306. The modulation bias voltage source 320 is also connected to a modulation component 310.

The master modulation component 310 is connected to the receiver 308 and the modulation bias voltage source 320. The modulation component 310 generates modulation signals that include or provide information/data to the bus 318. The information includes information provided by the bus master and can include control signals, measurements, and the like. In one example, the modulation component 310 generates modulation signals at a millivolt level.

The master receiver 308 is connected to the modulation component 310 and the first terminal. The master receiver 308 has a resistor connected in parallel to facilitate receiving. The resistor has an impedance that generally is set at about a line impedance $Z_L$ of the bus 318. In one example, the line impedance of the bus is at about 120 ohm and the resistor is also at an impedance of about 120 ohm. The receiver 308 is also referred to as a transceiver and obtains received signals from the bus 318.

The modulation component 310 and the receiver 308 are configured to perform data transmission at transmission frequencies or transmission band(s). In one example, the transmission frequencies range from about 100 kHz to about 50 MHz.

At low frequencies, the bus master side 302 exhibits relatively low ohmic behavior due to a feedback loop characteristic of the voltage source 306. Once a unity gain frequency of a control loop is exceeded, the impedance of the voltage source 306 increases sufficiently such that the bus master transceiver path substantially determines the impedance of the bus master 302.

The sensor side 304 includes a DC load 312, a sensor modulation source 322, a sensor modulation component 316, and a sensor receiver 314. The sensor modulation source 322, the sensor modulation component 316 and the sensor receiver 314 form a sensor transceiver path.

The DC load 312 is connected to third and fourth terminals of the bus 318. The DC load 312 consumes power. In one example the DC load 312 represents power consumed by a sensor. In another example, the DC load 312 represents power consumed by a control mechanism.

The sensor modulation bias source 322 provides or supplements power for the sensor transceiver path. The sensor modulation bias source 322 is coupled to the fourth terminal of the bus 318. The sensor modulation component 316 is connected to the modulation bias source 322 and the sensor receiver 314.

The sensor modulation component 316 generates sensor modulation signals that provide sensor information/data to the bus 318. The sensor information includes, for example, sensor measurements, temperature, and the like. The presence of the sensor modulation bias source 322 facilitates generation of sensor modulation signals at relatively low voltages, such as millivolts. The sensor information and the signals are generated within the transmission band(s).

The sensor receiver 314 is connected to the sensor modulation component 316 and the third terminal of the bus 318. The sensor receiver 314 receives signals, such as master modulation signals generated by the master modulation component 310. The sensor receiver 314 includes a resistor connected in parallel to facilitate receiving. The resistor has an impedance that generally is set at about a line impedance $Z_L$ of the bus 318. In one example, the line impedance of the bus is at about 120 ohm and the resistor is also at an impedance of about 120 ohm.

The impedance of the sensor side 304 is typically larger than the line impedance of the bus 318 at relatively low frequencies and trends toward the line impedance when the frequency range comes into the range of the transmission signal band.

The impedances of the sensor side 304 and the bus master side 302 are configured to have impedances within a limited matching band. This band is a range of values about or around the line impedance within the bands used for data transmission. In one example, the limited matching band includes a range between about 0.5 and 2 times the line impedance within the transmission bands.

EMC compliance can be obtained by using a wider frequency band for data transmission frequencies or range of frequencies used by the transceiver paths. The data transmission can then be shifted into a frequency range substantially free from distortion. Further, the data transmission at higher frequencies is possible because there are no low impedance requirements for the power supplied to the sensor side 304 at the data transmission frequency range, thus facilitating proper line termination.

At lower frequencies, supply impedance can be reduced omitting serial resistors compared with other approaches because of the separation of supply bandwidth or frequencies and the data transmission frequencies.

The bus side 302 and the sensor side 304 can be utilized in automotive systems and the like. For automotive systems, electronic control units (ECU) can be coupled to the bus 318 and be configured to utilize the data transmission and the voltage regulation. For example, the ECU can be configured to generate control information and provide it to the sensor 304 via the bus 318. Further, multiple sensors, such as the sensor 304 can also be connected to the bus 318 and also utilize the data transmission and the voltage regulation. Such sensors can be configured to generate the sensor information, described above, and provide automotive type information such as wheel vibration, rotation speed, and the like.

Figure 4A:
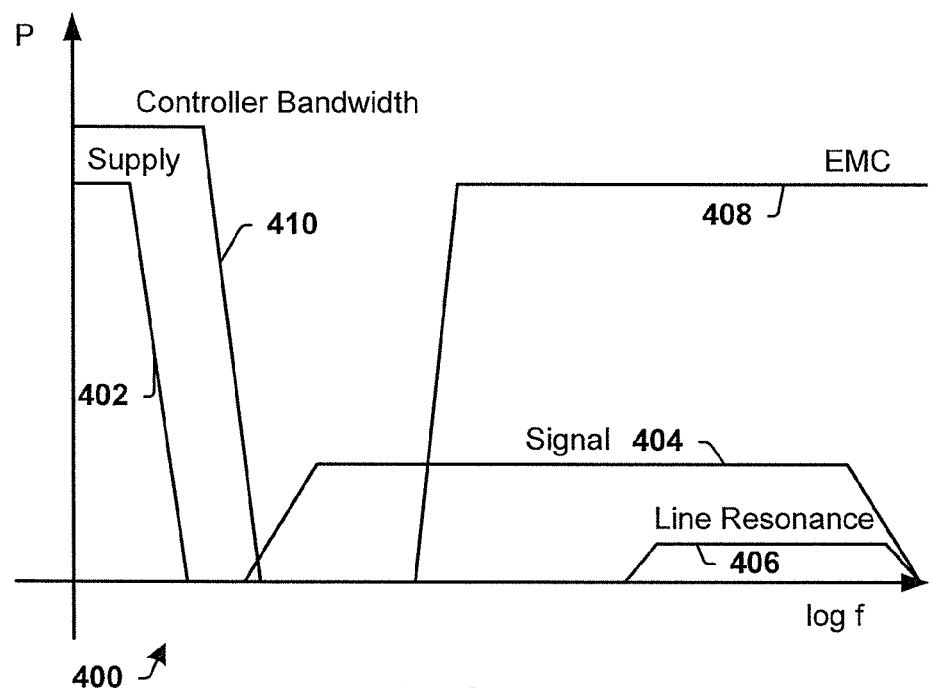
FIG. 4A is a graph depicting spectral locations for signals in a sensor interface system that separates frequency bands for data transmission and voltage regulation.

FIG. 4A is a graph 400 depicting spectral locations for signals in a sensor interface system that separates frequency bands for data transmission and voltage regulation. The locations are provided as examples of typical signals generated by a sensor system, such as the sensor system 300 of FIG. 3, described above.

The graph depicts a logarithmic frequency along an x-axis and power spectral density range (P) along a y-axis. The graph includes supply signal 402, a sensor signal 404, an LC or line resonance signal 406, EMC 408, and a controller signal 410.

The supply signal 402 is the output of the voltage source of a bus master, such as the bus master 302. The supply signal 402 has a small bandwidth or range of operating frequencies, which are shown as being relatively low. The data signal 404 is a data transmission or modulation signal. The signal 404 can be generated, for example, by the sensor transceiver path and/or the master transceiver path, as described above. The signal 404 has a relatively large bandwidth or range of frequencies, yet is at a relatively low power. In one example, the signal 404 uses a power spectral density at a fraction of the supply signal 402.

Due to the omission of buffer/blocking capacitors, the line resonance signal 406 is shown at relatively high frequencies, compared with other approaches, such as shown in FIG. 2A. The line resonance signal 406 is less, compared with other approaches, due to the limitation of the resonancy Q factor by the choice of proper line termination matching the master and sensor impedance with the line impedance. It is noted that the line resonance signal 406 is shown coexisting with only a small portion of the signal 404. Thus, the impact of the line resonance on the data signal 404 is substantially less than other approaches.

The controller signal 410 is a signal that controls the voltage supply of the master side supply voltage, such as the supply voltage 306 described above. This signal has a bandwidth that sufficiently exceeds the low bandwith of the power supply spectrum, but does not substantially interfere with the data signal 404, which has been modulated or shifted to a higher frequency.

The EMC signal 408 represents electromagnetic interference present in the sensor system. The EMC signal 408 typically varies upon implementation and operating environment.

Figure 4B:
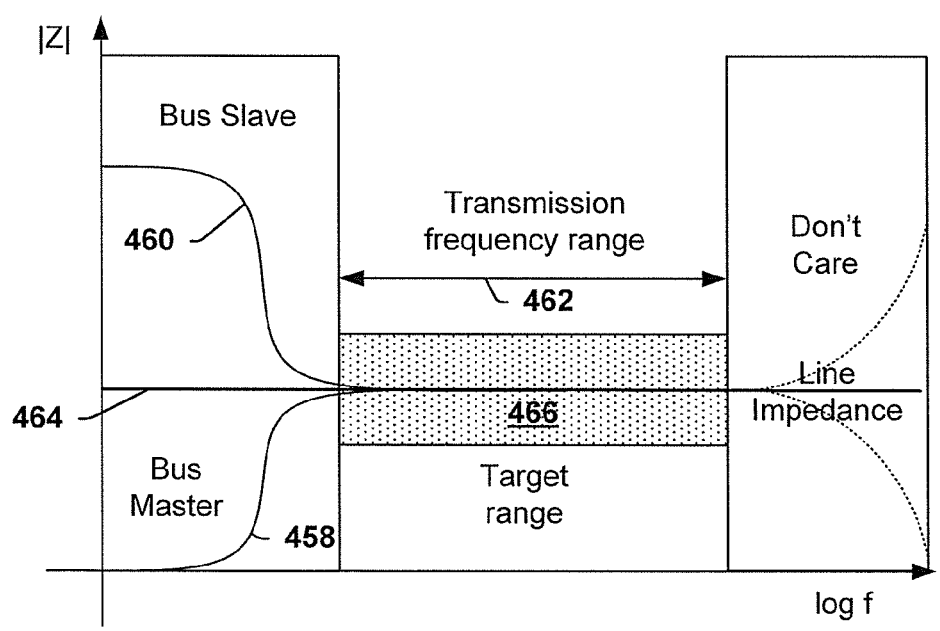
FIG. 4B is a graph depicting frequency dependencies for a sensor interface system that separates frequency bands for data transmission and voltage regulation.

FIG. 4B is a graph depicting frequency dependencies for a sensor interface system that separates frequency bands for data transmission and voltage regulation. The dependencies are provided as examples based on a sensor interface system, such as the system 300 described above.

An x-axis depicts frequency in a logarithmic fashion (log f). The y-axis depicts impedance Z in absolute value.

Line 464 represents a line impedance for a system bus, such as the bus 318 described above. The line impedance is substantially constant with varied frequencies. Line 458 depicts impedance for a bus master, such as the bus master side 302, described above. It can be seen that the bus master impedance is relatively low at lower frequencies. However, the bus master impedance substantially coincides with the line impedance within a transmission frequency range 462. A sensor or bus slave, such as the sensor side 304 described above, has an impedance depicted by line 460. The sensor impedance is relatively large at lower frequencies, but substantially coincides with the line impedance within the transmission frequency range 462. Both the sensor line impedance and the bus master line impedance fall within a limited matching band 466 within the transmission frequency range or transmission band.

At frequencies beyond the transmission frequency range 462, the sensor impedance and/or the bus master impedance can vary from the line impedance, but this occurs at frequencies of no importance, don't care frequencies.

Figure 5:
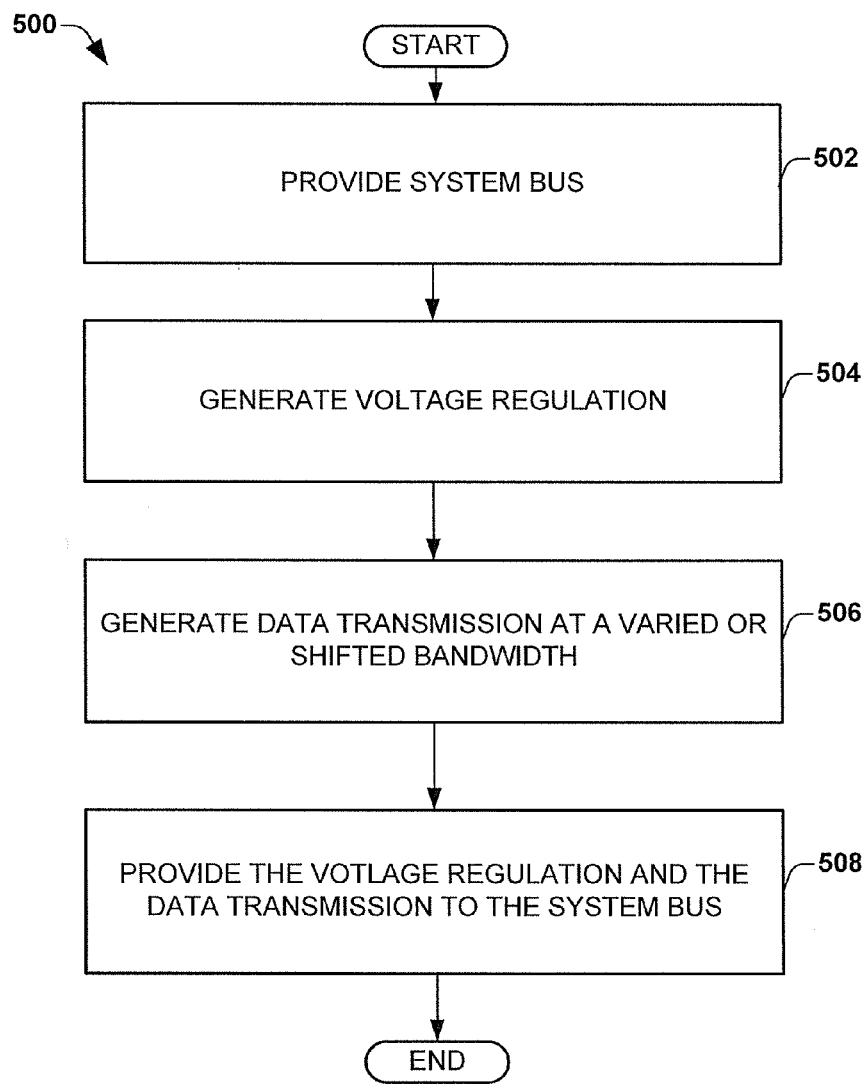
FIG. 5 is a flow diagram illustrating a method of providing voltage regulation and data transmission over a bus.

FIG. 5 is a flow diagram illustrating a method 500 of providing voltage regulation and data transmission over a bus. The method 500 modulates or shifts frequencies for data transmission away from the voltage regulation. Additionally, the power consumption for the data transmission is mitigated due to the frequency separation.

The method 500 begins at block 502, wherein a system bus is provided. The system bus can be an automotive system bus utilized in automobile systems. Such automotive system buses typically have line lengths ranging from centimeters to many meters. In another example, the bus includes two wires used for both voltage regulation and data transmission.

The bus typically has multiple components coupled to it. For example, a bus master and a plurality of sensors can be coupled to the bus.

Voltage regulation is generated at a voltage regulation bandwidth at block 504. The voltage regulation is generated by a voltage source, such as a voltage source present in a bus master coupled to the system bus. The voltage regulation is provided with selected characteristics, including the regulation bandwidth, upper and lower voltage levels, current levels, and the like. The voltage regulation bandwidth is relatively low, such as shown by line 402 in FIG. 4A.

Data transmission is generated at a transmission bandwidth at block 506. The data transmission includes information/data to be sent to the system bus and received by another component coupled to the system bus. The data transmission information includes control information, sensor measurements, and the like. The data transmission is modulated or shifted from an original bandwidth at an original center frequency, such as the bandwidth shown by line 204 in FIG. 2A to a shifted frequency band at a shifted or higher center frequency, the transmission frequency band, such as the band shown by line 404 in FIG. 4A. The bandwidth itself may vary from an original bandwidth to a shifted bandwidth, based upon a modulation scheme utilized. A modulation component, such as those described above, can be utilized to shift and generate the data transmission.

The voltage regulation and the data transmission are provided to the system bus at block 508. The voltage regulation and the data transmission can be combined prior to placing them on the bus. In one example, a coupler or mixer is used to combine the voltage regulation and the data transmission. In another example, the voltage regulation is placed on the bus by a bus master and the data transmission is placed on the bus by a sensor.

Additionally, impedance matching can be performed to properly terminate the data transmission. This is obtained by configuring termination impedances for components participating in the data transmission across the bus. The components are configured by matching their termination impedance with a line impedance of the bus.

While method 500 is illustrated and described below as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or embodiments of the disclosure herein. Also, one or more of the acts depicted herein may be carried out in one or more separate acts and/or phases.

It is appreciated that the claimed subject matter may be implemented as a method, apparatus, or article of manufacture using standard programming and/or engineering techniques to produce software, firmware, hardware, or any combination thereof to control a computer to implement the disclosed subject matter (e.g., the systems shown in FIGS. 1, 2, etc., are non-limiting examples of system that may be used to implement method 500). The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

A sensor interface system includes a system bus, a bus master and a sensor. The bus master is coupled to the system bus. The bus master is configured to provide voltage regulation at a first bandwidth and perform data transmission within or at a second bandwidth. The sensor is also coupled to the system bus. The sensor is configured to receive or utilize the voltage regulation and to perform data transmission within or at the second bandwidth.

Another sensor interface system includes a bus and a transceiver path. The transceiver path is coupled to the bus. Further, the transceiver path is configured to shift data transmission from a first frequency range up to a second frequency range.

A method of providing voltage regulation and data transmission is disclosed. A system bus or bus is provided. Voltage regulation is generated in a first frequency band. Data transmission is generated at a second frequency band. The second frequency band is varied from the first bandwidth. The voltage regulation and the data transmission are provided to the system bus.

In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention. In addition, while a particular feature of the invention may have been disclosed with respect to only one of several implementations, such feature may be combined with one or more other features of the other implementations as may be desired and advantageous "including", "includes", "having", "has", "with", or variants thereof are used in either the detailed description and the claims, such terms are intended to be inclusive in a manner similar to the term "comprising".

What is claimed is:

1. An automotive sensor interface system comprising:
   a system bus that includes a pair of wires;
   a bus master coupled to the system bus and configured to provide voltage regulation as a regulated voltage at a first frequency band and perform data transmission at a second frequency band, wherein the bus master includes a modulation component configured to shift the data transmission from an original band to the second frequency band, wherein the second frequency band is at higher frequencies than the first frequency band; and
   at least one sensor coupled to the system bus and configured to receive its power from the regulated voltage and to perform data transmission within the second frequency band.

2. The system of claim 1, wherein the system bus has a line impedance of about 120 ohm.

3. The system of claim 1, wherein the system bus has a length between about 2 centimeters and 12 meters.

4. The system of claim 1, further comprising additional components coupled to the system bus.

5. The system of claim 1, wherein the bus master includes a master transceiver path configured to perform the data transmission within the second frequency band.

6. The system of claim 1, wherein the bus master includes a supply voltage configured to provide the regulated supply to the sensors or other slaves connected to the bus.

7. The system of claim 1, wherein the sensor includes a sensor transceiver path configured to perform the data transmission.

8. The system of claim 1, wherein the sensor includes circuitry that represents a load configured to utilize the voltage regulation.

9. The system of claim 1, wherein the bus master and the sensor are configured to have impedances within in a limited matching band about a line impedance of the system bus within the second frequency band.

10. The system of claim 9, wherein the limited matching band is within a range of between 0.5 and 2 times the line impedance.

11. The system of claim 1, wherein the second frequency band is about 10 times higher than the first frequency band.

12. A sensor interface system comprising:
    a bus having a pair of wires;
    a voltage source coupled to the bus and configured to supply a DC voltage; and
    a transceiver path coupled to the bus and configured to shift data transmission from a first frequency range up to a second frequency range, wherein the transceiver path includes a receiver, a modulation component and a modulation voltage bias source, wherein the receiver is configured to receive signals from the bus, the modulation voltage bias source has a voltage less than the DC voltage and the modulation component is configured to shift the data transmission to the second frequency range.

13. The system of claim 12, wherein the transceiver path is further configured to receive data from the bus.

14. The system of claim 12, wherein the voltage source performs voltage regulation.

15. The system of claim 12, further comprising a load coupled to the bus, wherein the load consumes power from the bus.

16. The system of claim 12, wherein the modulation component is configured to generate modulation signals at the second frequency range.

17. A method of providing voltage regulation and data transmission, the method comprising:
    providing a system bus;
    generating voltage regulation at a first frequency band;
    shifting data transmission at an original frequency band to a second frequency band, wherein the second bandwidth is varied from the first frequency band; and
    providing the voltage regulation and the data transmission to the system bus.

18. The method of claim 17, further comprising matching impedance to a line impedance of the system bus.

19. The method of claim 17, further comprising receiving the voltage regulation from the bus and providing sensor data to the bus by a sensor.

* * * * *